United States Patent [19]

Spiteri

[11] 4,173,013
[45] Oct. 30, 1979

[54] COMBINATION TURN SIGNAL AND HAZARD WARNING FLASHER WITH VARIABLE LOAD

[76] Inventor: Joseph Spiteri, P.O. Box 71, Harborcreek, Pa. 16421

[21] Appl. No.: 879,470

[22] Filed: Feb. 21, 1978

[51] Int. Cl.² .............................................. B60Q 1/38
[52] U.S. Cl. ..................... 340/73; 340/81 R; 340/331; 315/200 A
[58] Field of Search .......... 340/73, 81 R, 81 F, 340/52 F, 78, 67, 331; 315/200 A

[56] References Cited

U.S. PATENT DOCUMENTS

| | | | |
|---|---|---|---|
| 3,896,415 | 7/1975 | Carter | 340/78 |
| 3,940,657 | 2/1976 | Kasiewicz | 340/81 R |
| 3,955,174 | 5/1976 | Ives et al. | 340/81 R |
| 4,080,588 | 3/1978 | Seitter et al. | 340/81 R |

OTHER PUBLICATIONS

"Car Indicator Emergency Flasher," J. B. Dance, *Practical Electronics*, May 1975, pp. 410-413.

*Primary Examiner*—Donald J. Yusko
*Attorney, Agent, or Firm*—Ralph Hammar

[57] ABSTRACT

A combination turn signal and hazard warning flasher with variable load in which (1) the flashing frequency is controlled by a Cmos oscillator with a flashing frequency independent of lamp voltage or current, (2) the lamp load current passes through relay contacts and not through the turn signal switch, and (3) which may be used on positive ground and negative ground systems.

6 Claims, 2 Drawing Figures

COMBINATION TURN SIGNAL AND HAZARD WARNING FLASHER WITH VARIABLE LOAD

Heretofore electronic turn signal and emergency signal flashers for trucks have had the lamp load current going through the turn signal switch and have been usable in either positive ground or negative ground systems but not both. Since trucks are about evenly divided between positive and negative ground power systems and since the flashing lamp load is increasing due to the growing use of a single tractor for pulling two or three trailers, the increased lamp load has shortened the life of the turn signal switch and has interfered with the flashing frequency.

This invention is intended to provide an emergency and turn signal flasher in which the flashing lamp load is carried by separate relays so that only the relay coil current for controlling the relay flows through the turn signal switch. By this means the reliability of the flasher is increased and the life of the turn signal switch is greatly extended.

Figure 1:
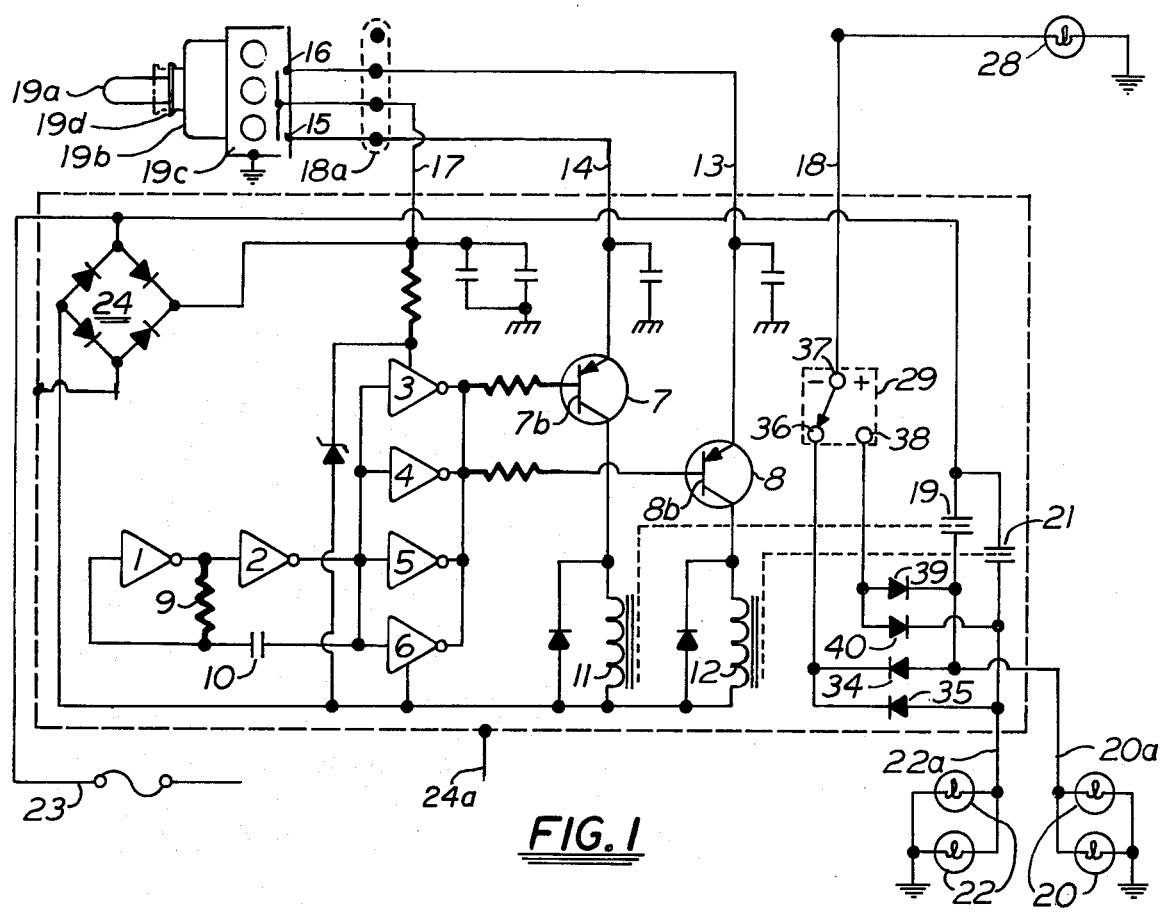
FIG. 1 is a circuit diagram.

The flasher uses an IC Chip (Motorola 4049) consisting of six inverters each having the property of switching from an output of zero when the input is one to an output of one when the input is zero. The IC Chip contains the necessary circuit components and input and output power connection. These chips are made in large quantities for the computer industry. In the particular IC Chip illustrated the inverters are numbered 1 through 6 inclusive. Inverters 1 and 2 are connected to provide an oscillator running at the flashing frequency of the lamps. The inverters 3, 4, 5 and 6 act as a buffer and have their inputs connected in parallel to the output of inverter 2 and have their outputs connected to the base electrodes 7b, 8b of switching transistors 7, 8 (2N2905APNP). The frequency of the Cmos oscillator 1, 2 is determined by resistor 9 and capacitor 10. When the switching transistors are biased on, current for the coils of relays 11, 12 (Bosch 0332014115) is respectively obtained from conductors 13, 14 and switches 15, 16 are respectively connected to the live side of the power supply through conductor 17. When the turn signal switch is in neutral position shown the switches 15, 16 are both open. When the switch 15 is closed the relay 11 which supplies the flashing lights on the right side is energized. When the switch 16 is closed the relay 12 which supplies the flashing lights on the left side is energized. For emergency or four-way flashing, both switches 15 and 16 are closed simultaneously and all lights flash. The oscillator runs all of the time. It consumes a negligible amount of current, about as much as a clock. The oscillator biases the transistors on and off but no current flows through the turn signal unless one or both of the switches 15, 16 is closed. Only the current for operating the switching transistors and relay coils is obtained through the switches 15, 16. This current is relatively small and is independent of the number of lights. The current for the lights is obtained direct from the power supply through contacts 19 of the relay 11 which controls the flashing lights 20 on the right side or through contacts 21 of the relay 12 which controls the lights 22 on the left side. The number of flashing lights varies with the number of trailer units being hauled by the tractor and with the type of unit. Ambulances carry a large number of flashing lights.

The frequency of the Cmos oscillator is independent of the number of flashing lights 20, 22 or shorts in the lamp circuits. For example in the four-way flashing mode, one of the lights 20 may be temporarily shorted and the lights 22 and the remaining lights 20 will continue flashing at the same frequency. The buffer action of the inverters 3, 4, 5, 6 isolates the Cmos oscillator from the transistors.

The power for operating the lights 20, 22 and for running the Cmos oscillator comes from the live side 23 of the power supply. The power for the oscillator is taken from live wire 23 through a full wave bridge rectifier 24 which makes the oscillator usable on a.c. and also on positive or negative ground d.c. power systems. The power for the lights is taken directly from live wire 23 through relay contact 19 and 21. The power for relay coils 11, 12 is taken from wire 23 through bridge 24, switches 15, 16 in the turn signal handle and transistors 7, 8. The switches 15, 16 are required to carry only the relatively small current required for the relay coils 11, 12 e.g. 0.3 ampere for each relay while the relay contacts 19, 21 carry the heavy current through conductors 20a, 22a to lights 20, 22 which may run up to 2-25 amperes for each relay. In the particular circuit shown, each relay has a rated current carrying capacity of 30 amperes so that there is a large factor of safety.

The circuit so far described constitutes a flashing unit which would normally be mounted under the dash and would be connected to the turn signal handle 19a through connector 18a for wires 13, 14, 17 and 18 and to the hot and ground sides of the battery through wires 23 and 24a. The turn signal handle 19a carried by a structure 19b which also carries the switches 15, 16 is a standard unit mounted on the steering column which need not be further described.

In order to be sure that the turn signal is working properly, an indicator lamp 28 is provided connected through conductor 18 and switch 29 and the conductors 20a, 22a to ground. Although shown at the extreme right of FIG. 1, the indicator lamp actually is located beneath plate 19c which pivots with the handle. The handle also has a switch operator 19d which when pulled out closes both turn signal switches 15 and 16 so that all of the lamps flash. The three holes in the plate 19c allow the light to shine through in the proper location for left hand turn, right hand turn and four-way flash. Power for the lamp 28 is obtained through switch 29 from the conductors 20a, 22a which supply the right and left hand side lamps. When ground is negative, as shown, power for the indicator lights 28 is obtained from the hot side 23 of the power line through contacts 19, conductors 20a, 22a, rectifiers 34, 35, switch contact 36, switch arm 37, and conductor 18 leading to the indicator lamp. For a positive ground system the switch arm 37 would be moved to switch contact 38 and the power would flow from conductors 20a, 22a through rectifiers 39, 40. This means the indicator lamp 28 would obtain power only when the lamps 20 or 22 were flashing and this in conjunction with the position of the turn signal handle would indicate which lamps were flashing.

All of the turn signal units would have the same construction. When a unit was installed on a positive or negative ground system it would only be necessary to close the switch arm 37 on contact 38 or 36. No rewiring would be necessary.

Figure 2:
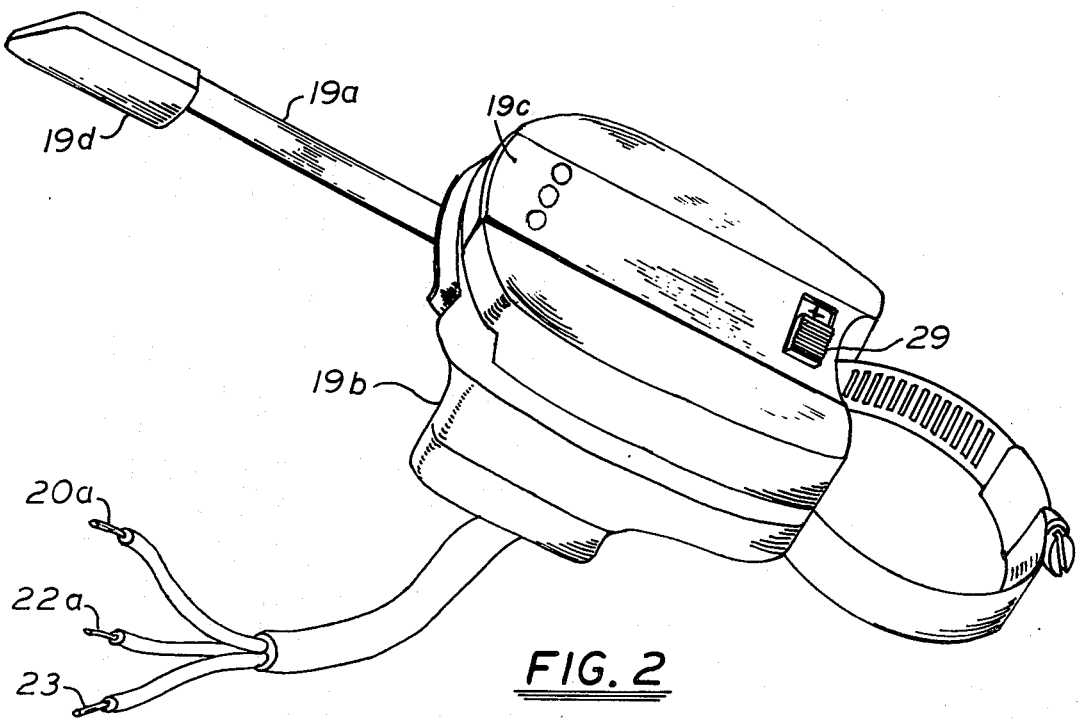
FIG. 2 is a perspective of a turn signal unit.

Because of the small size of the components it is possible to make the flasher part of the turn signal handle as shown in FIG. 2.

The turn signal including the oscillator, switches, relays, and handle are a single hybridizing unit adapted to be mounted on the steering column of a truck. Only three wires are needed for installation, a wire 23 leading to the power supply, a wire 20a leading to the lamps on the right side and a wire 22a leading to the lamps on the left side.

I claim:

1. A combination turn signal and hazard warning flasher comprising an IC Chip oscillator having an output of pulses at flashing frequency,
   a switching transistor biased on by said pulses,
   a relay coil in series with said transistor,
   said relay having normally open contacts connected to the power supply and the lights to be flashed and closed when said coil is energized,
   and a selector switch for selecting the lights to be flashed, said selector switch connecting the power supply to the switching transistor and coil for energizing the relay coil and thereby causing closing of the relay contact for the duration of said pulses.

2. The structure of claim 1 in which the IC Chip is further defined as a Cmos hex inverter with two of the inverters connected as an oscillator and a plurality of the remaining inverters connected as a buffer between the oscillator and the switching transistor.

3. A turn signal flasher unit adapted to be mounted on the steering column of a truck, said unit comprising a control for selecting right or left lights to be flashed, an IC Chip oscillator having an output of pulses at flashing frequency,
   a switching transistor biased on by said pulses,
   a relay coil in series with said transistor,
   said relay having normally open contacts connected by a circuit independent of said relay, switching transistor and control to the power supply and lights to be flashed and closed when said relay coil is energized,
   said control selector supplying power to the switching transistor for energizing the relay coil and thereby causing closing of the relay contacts for the duration of said pulses,
   and wiring for the unit consisting of a wire connected to the power supply, a wire connected to the right lights and a wire connected to the left lights.

4. The structure of claim 1 plus an indicator lamp energized through said lights.

5. The flasher of claim 1 in which the live side of power input is through a full wave bridge rectifier so the operation is the same whether the ground is negative or positive.

6. A turn signal flasher unit adapted to be mounted on the steering column of a motor vehicle, said unit consisting essentially of a control for selecting right or left lights to be flashed, means for generating an output of pulses at flashing frequency,
   switching means turned on by said pulses,
   a relay having a coil in series with said switching means and said control,
   said relay having normally open contacts connected by a circuit independent of said relay coil, switching means and control to the power supply and lights to be flashed and closed when said relay coil is energized,
   said control selector supplying power for energizing the relay coil and thereby causing closing of the relay contacts for the duration of said pulses,
   and wiring for the unit consisting of a wire connected to the power supply, a wire connected to the right lights and a wire connected to the left lights.

* * * * *